WILLIAM WESTLAKE.

Improvement in Lanterns.

No. 4,601. Reissued Oct. 17, 1871.

Witnesses

E. B. Herman

A. W. Bond

William Westlake

Inventor

By Wait & Bond

Attorneys

AM. PHOTO-LITHOGRAPHIC CO. N.Y. (OSBORNE'S PROCESS.)

UNITED STATES PATENT OFFICE.

WILLIAM WESTLAKE, JAMES F. DANE, AND JOHN P. COVERT, OF CHICAGO, ILLINOIS, ASSIGNEES, BY MESNE ASSIGNMENTS, OF WILLIAM WESTLAKE.

IMPROVEMENT IN LANTERNS.

Specification forming part of Letters Patent No. 48,858, dated July 18, 1865; reissue No. 2,337, dated August 14, 1866; reissue No. 4,601, dated October 17, 1871.

*To all whom it may concern:*

Be it known that I, WILLIAM WESTLAKE, of the city of Chicago, in the county of Cook and State of Illinois, have invented certain new and useful Improvements in Lanterns; and I do hereby declare that the following is a full, clear, and exact description thereof, reference being had to the accompanying drawing making a part of this specification, in which—

Figure 1:
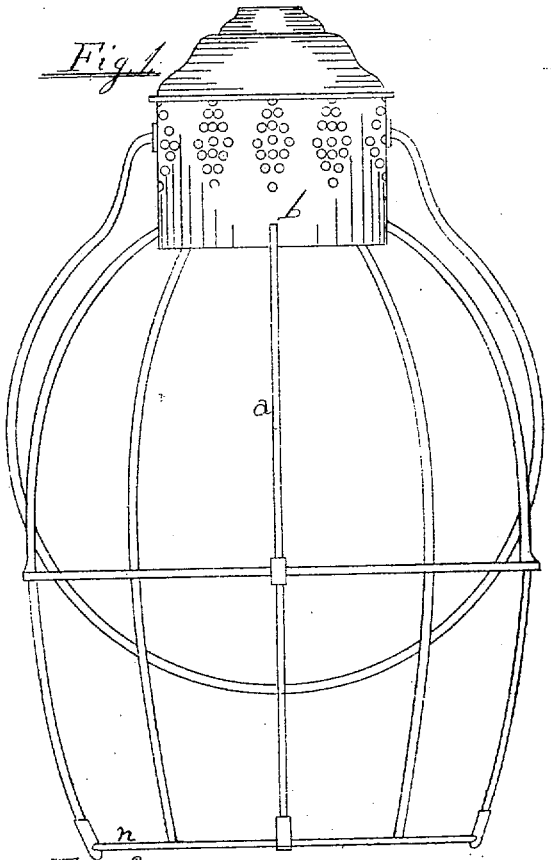
Figure 2:
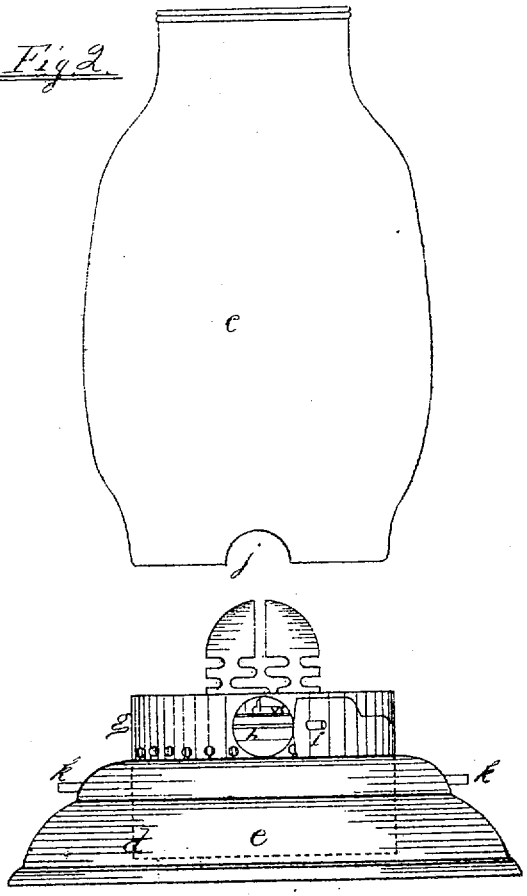
Figure 3:
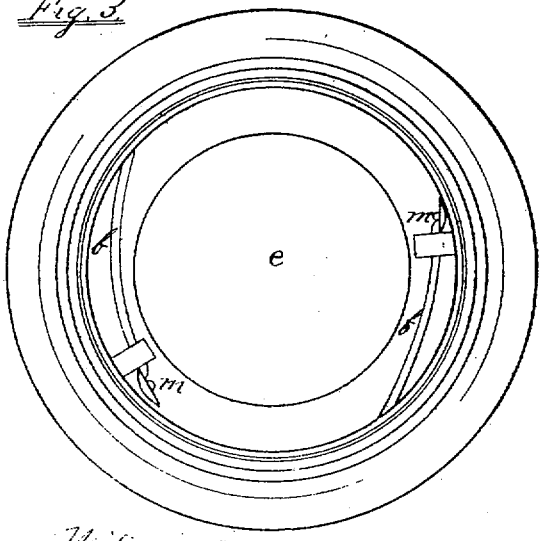

Figure 1 is an elevation of the dome and guard; Fig. 2, an elevation of the globe and base separated; and Fig. 3 a bottom view of the base.

In the drawing, *a* is the guard; *b*, the dome; *c*, globe; *d*, lower rim or base-flange; *e*, oil-pot; *f k*, spring-catches; *g*, band for supporting the globe; *h*, opening for lighting or ventilating; *i*, sliding door or cap; *j*, cut in globe; *m*, button for operating spring-catches; and *n*, lower ring of guard. It will be seen that the guard is attached at its upper end to the dome, so as to form one piece with the dome, and that it is detachable from the base of the lantern; that the globe *c* is a loose or uncemented globe, which can be removed through the lower guard-ring *n;* and that the guard is extended downward so as to pass over and below the mountings upon which the globe rests, and is secured directly to the lower flange or band *d* of the base by spring-catches. By resting the globe upon the band *g* which contains the perforations for the admission of air, and by extending the guard and connecting it directly with the base *d* of the lantern I simplify the construction of the lantern, as I dispense with the bands and flanges which are necessary to make the connection between the base and the enlarged lower ring of the guard, when such connection is made above the holes for ventilating the lantern, as is shown in the lantern patented to Charles Waters, July 17, 1855; and I also avoid obstructing the passage of the light downward, so as to leave a much smaller dark space below the lantern than is left by any lantern heretofore constructed which had the lower ring or band of the guard large enough to pass over a globe. A hole, *h*, is made through the flange *g* for inserting a match or other means of ignition; a slide, *i*, being provided for closing this hole, as shown in Fig. 2, the globe being also provided with a corresponding notch, *j*, to coincide with the hole *h*, and thus leave an unobstructed opening for lighting the lantern without removing the oil-pot.

The parts are put together by placing the globe within the band *g*, so that its projecting or swelled portion will rest upon the upper end of said band. The guard *a* with the dome *b* are then placed over the globe and pressed down until the ring or band *n* comes in contact with the base *d*, in which position it will be held by the spring-catches *k*.

This connection and arrangement of the parts admits of the easy handling and every facility for attaching and detaching the several parts, and the replacing of any broken or injured pieces; and by making the band *g* without flanges or turned portions it readily conforms to any irregularities of form in the globe, so that a much closer fit can be made.

What I claim as new is as follows:

1. The combination of the globe *c* and base *d* with the guard *a*, the latter being extended down and connected directly to the base by means of springs or their equivalents, whereby the use of lateral flanges is dispensed with and the globe can be removed through the lower end of the guard, substantially as described.

2. The flange *g*, provided with an opening, *h*, and a slide *i*, substantially as and for the purpose set forth.

WILLIAM WESTLAKE.

Witnesses:
E. A. WEST,
O. W. BOND.

(90)